US006347322B1

(12) United States Patent
Bogantz et al.

(10) Patent No.: US 6,347,322 B1
(45) Date of Patent: Feb. 12, 2002

(54) TRANSACTION STATE DATA REPLICATION BY TRANSACTION FORWARDING IN REPLICATED DATABASE SYSTEMS

(75) Inventors: Robert L. Bogantz, Columbus; Gary Michael Green, Lancaster; Sidney Dean Hester, Pickerington, all of OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/188,465

(22) Filed: Nov. 9, 1998

(51) Int. Cl.[7] .............................................. G06F 12/00
(52) U.S. Cl. ......................... 707/202; 707/201; 707/10
(58) Field of Search .......................... 707/10, 202, 204, 707/201

(56) References Cited

U.S. PATENT DOCUMENTS

| | | | | |
|---|---|---|---|---|
| 4,819,159 A | * | 4/1989 | Shipley et al. | 714/19 |
| 5,036,518 A | * | 7/1991 | Tseung | 714/748 |
| 5,170,480 A | * | 12/1992 | Mohan et al. | 707/201 |
| 5,261,069 A | * | 11/1993 | Wilkinson et al. | 711/145 |
| 5,633,999 A | * | 5/1997 | Clowes et al. | 714/6 |
| 5,781,910 A | * | 7/1998 | Gostanian et al. | 707/201 |
| 5,781,912 A | * | 7/1998 | Demers et al. | 707/202 |
| 5,796,999 A | * | 8/1998 | Azagury et al. | 707/10 |
| 5,805,798 A | * | 9/1998 | Kearns et al. | 714/48 |
| 5,999,931 A | * | 12/1999 | Breitbart et al. | 707/10 |
| 6,122,630 A | * | 9/2000 | Strickler et al. | 707/8 |

OTHER PUBLICATIONS

King, R.P. et al. "Management of a Remote Backup Copy for Disaster Recovery", ACM Transactions on Database Systems, vol. 16, No. 2, Jun. 1991, pp. 338–368.*

King et al., "Management of a Remote Backup Copy for Diaster Recovery", ACM Transactions on Database Systems, vol. 16, No. 2, Jun. 1991, pp. 338–368.*

Singhal, Mukesh, "Update Transport: A New Technique for Update Synchronization in Replicated Database Systems", IEEE Transactions on Software Engineering, vol. 16, No. 12, Dec. 1990, pp. 1325–1336.*

(List continued on next page.)

*Primary Examiner*—Jean R. Homere
*Assistant Examiner*—Luke S Wassum
(74) *Attorney, Agent, or Firm*—Stevens Showalter LLP

(57) ABSTRACT

A transaction processing system comprises a querying system and a logical database having an active database and a backup database. The querying system transmits a message for a transaction to the logical database for processing. The message is transmitted to the active database where the message is processed. The active database creates transaction state data based, in part, on the message. The active database transmits a response message to the querying system and forwards the original message to the backup database. The backup database processes the original message and creates its own transaction state data. The transaction state data in the backup database operationally matches the transaction state data in the active database so that if the active database fails, the backup database includes the requisite transaction state data necessary to complete the transaction. The querying system processes the response message and transmits a termination message to the logical database for processing. The termination message is transmitted to the active database and processed. The termination message is forwarded to the backup database from the active database and similarly processed. The transaction is then complete and both databases are fully replicated.

36 Claims, 4 Drawing Sheets

OTHER PUBLICATIONS

Schneider, Fred B. "Implementing Fault–Tolerant Services Using the State Machine Approach: A Tutorial", ACM Computing Surveys, vol. 22, No. 4, Dec. 1990, pp. 299–319.*

King et al. "Management of a Remote Backup Copy for Disaster Recovery", ACM Transactions on Database Systems, vol. 16, No. 2, Jun. 1991, pp. 338–368.*

Singhal, Mukesh. "Update Transport: A New Technique for Update Synchronization in Replicated Database Systems", IEEE Transactions on Software Engineering, vol. 16, No. 12, Dec. 1990, pp. 1325–1336.*

Rusinkiewicz, M., and D. Georgakopoulos. "Transaction Management in a Distributed Database System for Local Area Networks", Proceedings of the 7th Symposium on Reliable Distributed Systems, Oct. 10–12, 1988. pp. 177–182.*

Singhal, Mukesh. "A Fully–Distributed Approach to Concurrancy Control in Replicated Database Systems", Proceedings of the 12th International Conference on Computer Software and Applications, Oct. 5–7, 1988. pp. 353–360.*

Rusinkiewciz, M., and D. Georgakopoulos. "Request II: A Distributed Database System for Local Area Networks", Proceedings of the 1986 IEEE Fall Joint Computer Conference, pp. 1179–1188.*

Bernstein, P., and N. Goodman. "An Algorithm for Concurrancy Control and Recovery in Replicated Distributed Databases", ACM Transactions on Database Systems, vol. 9, No. 4, Dec. 1984, pp. 596–615.*

* cited by examiner

TRANSACTION STATE DATA REPLICATION BY TRANSACTION FORWARDING IN REPLICATED DATABASE SYSTEMS

BACKGROUND OF THE INVENTION

The present invention relates in general to replicated database systems, and, more particularly, to a system and method for improving the reliability of replicated database systems.

Many industry applications, such as airline reservation systems, banking applications and telecommunications, require reliable database transaction processing. A transaction is a sequence of actions or operations that must be performed in its entirety or not at all. Any degradation in reliability has a negative impact on the customer (e.g., the individual making an airline reservation) as well as the service provider (e.g., the airline). For example, if airline transactions are not reliably processed, customers may experience flight overbooking and, as a result, may choose to fly a different airline.

Historically, systems requiring highly reliable transaction processing have been built using highly fault tolerant computing hardware. Typically these systems are guaranteed to function up to 99.9999% of the time which equates to only 30 minutes of downtime/failure time per year. Such a highly fault tolerant computing system is also service reliable as it is nearly always available. Service reliability is a primary objective in designing such computing hardware.

Fault tolerant systems are very expensive and tend to lag behind the "technology innovation curve" by several years. For example, a fault tolerant system may only support on the order of megabytes of memory while a non-fault tolerant system may support on the order of gigabytes of memory. The fault tolerant system providers must transform commercially available hardware into reliability hardened hardware for fault tolerant systems which typically takes two to three years. This transformation process typically entails providing hardware component redundancy and sophisticated hardware failure detection. The underlying objective is to provide a system that rarely fails and is thus nearly always available.

In recent years non-fault tolerant computing systems have become very inexpensive and provide orders of magnitude greater performance in both memory capacities and processor speeds. While the performance of the computing systems have increased, the cost of such computing systems have decreased significantly such that a number of replicated non-fault tolerant computing systems is inexpensive compared to the corresponding fault tolerant computing system. Service reliability may be achieved utilizing less expensive but less reliable computing systems. Instead of utilizing expensive fault tolerant systems, service reliability can be achieved by utilizing redundant non-fault tolerant systems. The idea is to provide an appropriate number of fully replicated systems so that individual system failures do not negatively affect service reliability. Since these systems provide orders of magnitude more performance and capacity, the end result is higher performance and lower cost computing networks with service reliability that is as good as, and often better than, existing networks utilizing fault tolerant systems.

However, there are a number of factors that must be addressed so that a transaction is reliably processed in the midst of system failures. Transaction processing is typically divided into two distinct categories: executing the intent of the transaction and updating/reading the database; and, maintaining the transaction state data required to execute the transaction. There are well understood methods of reliably performing the first category of transaction processing and assuring that data already in a database is stored reliably, e.g., two-phase-commit protocols, redundant array of independent disks (RAID) and shared disk systems.

Transaction state data (TSD) is transient data associated with a single transaction. It is data that is maintained for the life of a transaction to assure that all the parts/messages of the transaction are executed correctly. There is a difference between the data corresponding to the records in a database, e.g., customer specific data, and TSD. Each record in a database includes data unique to that record while TSD is created by the computing system to assure that multiple messages for a particular transaction are correlated appropriately. TSD is also created to store intermediate data needed for subsequent message processing for the transaction.

Referring now to FIG. 1, a typical replicated database system 10 is illustrated. The replicated database system 10 comprises a querying system 20 and a logical database 30. The querying system 20 is the system from which all transactions originate. The querying system 20 is configured to generate transactions accessing records in the logical database 30 in response to requests by one of a number of database users 60 accessing the database system 10. For example, the querying system 20 could be part of an airline reservation system with users accessing and entering reservation data via terminals or a telecommunications switch that is sending transactions to a calling card database for card and personal identification number (PIN) validation. It is the system that requires reliable transaction processing and data storage.

The logical database 30 is the system to which the querying system 20 sends transaction messages for reliable processing and data storage. It is referred to as a logical database because it is actually comprised of multiple physical databases. In the illustrated system, the logical database 30 comprises two physical databases, an active database 40 and a standby database 50. The logical database 30 also comprises a reliable transaction distributor 70 which receives transaction messages from the querying system 20 and transmits them to one of the databases 40, 50. The reliable transaction distributor 70 also receives response messages from one of the databases 40, 50 and transmits them to the querying system 20. It will be appreciated by those skilled in the art that the reliable transaction distributor 70 may be located within the querying system 20. It will be further appreciated by those skilled in the art that the querying system 20 and the logical database 30 may each comprise a reliable transaction distributor. It will be even further appreciated by those skilled in the art that the reliable transaction distributor 70 is viewed logically as one system but could be comprised of a plurality of physical systems.

The exact number of physical databases within the logical database 30 is completely transparent to the querying system 20. The reliable transaction distributor 70 is the only component that needs to keep track of the number of physical databases. The databases 40, 50 are fully replicated with each database comprising an identical set of records. The active database 40 is the database that receives transaction messages from the reliable transaction distributor 70 during normal operations, i.e., absent any failures in the active database 40. The backup database 50 is available for use whenever the active database 40 is experiencing problems.

A typical transaction is described below. Message 1 of the transaction is sent from the querying system 20 to the logical database 30 for processing (step 1). The reliable transaction database 70 receives message 1 and transmits it to the active database 40 for processing (step 2). The active database 40 retrieves data from an appropriate record in the database and creates internal TSD for subsequent message processing of the transaction. The active database 40 then creates and sends a response message based on the data retrieved from the database and message 1 to the reliable transaction distributor 70 (step 3) for transmission to the querying system 20 (step 4). The querying system 20 then monitors the transaction and transmits a termination message to the logical database 30 (step 5) at the conclusion of the transaction from the view of the querying system 20. The reliable transaction distributor 70 receives the termination message and transmits it to the active database 40 for processing (step 6). The active database 40 processes the termination message using the TSD. The active database 40 also updates the appropriate records in the database as necessary. The active database 40 transmits the updated data to the backup database 50 (step 7). The backup database 50 updates the appropriate records in the database so that the databases 40, 50 remain fully replicated.

The above illustration could be used in a telecommunication system where a customer uses a pre-paid calling card to place a call. The querying system 20 transmits customer identification data and call originating data in the form of message 1 to the logical database 30 for customer and PIN identification. The active database 40 confirms the customer information from the database along with the balance available on the card. The TSD created by the active database 40 includes message correlation data and call originating data for deriving billing information. The response message instructs the querying system 20 that the customer identification data has been verified and that the call may proceed. The querying system 20 connects the call and monitors the call to determine when the call is completed and disconnected. The querying system 20 determines the duration of the call and transmits this information in the form of the termination message to the logical database 30. The active database 40 derives a charge for the call and subtracts the charge from the balance in the database. The new balance is then transmitted to the backup database 50 so that the databases 40, 50 remain fully replicated.

Referring now to FIG. 2, the above transaction will be described assuming that the active database 40 fails after the response message is created and transmitted to the reliable transaction distributor 70 (step 3). The reliable transaction distributor 70 receives the response message and transmits it to the querying system 20 (step 4). Using the calling card example, the call is then connected. The querying system 20 transmits the termination message to the logical database 30 (step 5). Since the active database 40 has failed, the reliable transaction distributor 70 transmits the termination message to the backup database 50 (step 6'). Unfortunately, the backup database 50 does not contain any TSD for the transaction such that message correlation fails and the message is not processed. The transaction itself fails since all of the steps of the transaction could not be completed.

Accordingly, there is a need for a replicated database system and a method for processing a transaction in such a system that allows a transaction to be completed even after the active database fails. There is another need for such a replicated database system that utilizes non-fault tolerant components but maintains service reliability. Preferably, such a system is relatively easy to implement and cost effective.

SUMMARY OF THE INVENTION

The present invention meets these needs by providing a database system comprising a querying system and a logical database having an active database and a backup database. The querying system transmits a message for a transaction to the logical database for processing. The message is transmitted to the active database where the message is processed. The active database creates transaction state data based, in part, on the message. The active database transmits a response message to the querying system and forwards the original message to the backup database. The backup database processes the original message and creates its own transaction state data. The transaction state data in the backup database matches the transaction state data in the active database so that if the active database fails, the backup database includes the requisite transaction state data necessary to complete the transaction.

The querying system processes the response message and transmits a termination message to the logical database for processing. The termination message is transmitted to the active database and processed. The termination message is forwarded to the backup database from the active database and similarly processed. The transaction is then complete and both databases are fully replicated.

According to a first aspect of the present invention, a method for processing a transaction in a replicated database system is provided. The database system comprises a plurality of replicated databases, an active database and at least one backup database. Transaction messages for the transaction are received from a querying system in the active database. The transaction messages are processed for the transaction in the active database. The active database creates response messages based on the transaction messages. The active database also creates active database transaction state data representative of the transaction. The response messages are transmitted to the querying system. The transaction messages for the transaction are forwarded from the active database to the backup database. The transaction messages of the transaction are processed in the backup database with the backup database creating backup database transaction state data representative of the transaction.

The step of processing the transaction messages of the transaction in the backup database may further comprise the step of creating a suppressed response message in the backup database based on the transaction messages. Alternatively, the step of processing the transaction messages of the transaction in the backup database does not comprise the step of creating a response message in the backup database based on the transaction messages forwarded by the active database. The step of forwarding the transaction messages for the transaction from the active database to the backup database may comprise the step of transmitting control header data from the active database to the backup database with the control header data enabling the backup database to process the first message consistent with the active database. The control header data may comprise unique transaction identification data representative of the transaction or time stamp data. The steps of the method may be repeated for a plurality of transactions. The method may further comprise the step of serializing the plurality of transactions so that the plurality of transactions are processed in the same order in both the backup database and the active database.

According to another aspect of the present invention, a method for processing a transaction in a replicated database system is provided. The database system comprises a plurality of replicated databases, an active database and at least one backup database. A first message for the transaction is transmitted from a querying system to the database system.

The first message for the transaction is processed in the active database with the active database creating a response message based on the first message. The active database also creates active database transaction state data representative of the transaction. The response message is transmitted to the querying system. The first message for the transaction is forwarded from the active database to the backup database. The first message for the transaction is processed in the backup database with the backup database creating backup database transaction state data representative of the transaction. A second message for the transaction is transmitted from the querying system to the database system. The second message for the transaction is processed in the active database using the active database transaction state data. The second message for the transaction is forwarded from the active database to the backup database. The second message for the transaction is processed in the backup database using the backup database transaction state data.

The step of processing the first transaction message of the transaction in the backup database may further comprise the step of creating a suppressed response message in the backup database based on the first transaction message. Alternately, the step of processing the first transaction message of the transaction in the backup database does not comprise the step of creating a response message in the backup database based on the first transaction message forwarded by the active database. The step of forwarding the first message for the transaction from the active database to the backup database may further comprise the step of transmitting control header data from the active database to the backup database with the control header data enabling the backup database to process the first message consistent with the active database. The control header data may comprise unique transaction identification data representative of the transaction or time stamp data. The steps of the method may be repeated for a plurality of transactions. The method may further comprise the step of serializing the plurality of transactions so that the plurality of transactions are processed in the same order in the both the backup database and the active database.

The step of processing the first message for the transaction in the active database may comprise the step of storing the active database transaction state data in the active database. The step of processing the first message of the transaction in the backup database may comprise the step of storing the backup database transaction state data in the backup database. The step of processing the first message for the transaction in the active database may comprise the step of accessing at least one of a plurality of records in the active database. The step of processing the first message of the transaction in the backup database may comprise the step of accessing at least one of a plurality of records in the backup database.

According to yet another embodiment of the present invention, a method for processing a transaction in a replicated database system is provided. The database system comprises a plurality of replicated databases, an active database and at least one backup database. A first message for the transaction is transmitted from a querying system to the database system. The first message for the transaction is processed in the active database with the active database creating a response message based on the first message. The active database also creates active database transaction state data representative of the transaction. The response message is transmitted to the querying system while the first message for the transaction is forwarded from the active database to the backup database. The first message of the transaction is processed in the backup database with the backup database creating backup database transaction state data representative of the transaction. A second message for the transaction is transmitted from the querying system to the database system. If the active database is available, then the second message is processed by the active database using the active database transaction state data. The second message for the transaction is also forwarded from the active database to the backup database and processed using the backup database transaction state data. Otherwise, the second message for the transaction is processed by the backup database using the backup database transaction state data.

The step of forwarding the first message for the transaction from the active database to the backup database may comprise the step of transmitting control header data from the active database to the backup database with the control header data enabling the backup database to process the first message consistent with the active database. The control header data may comprise unique transaction identification data representative of the transaction or time stamp data. The steps of the method may be repeated for a plurality of transactions. The method may further comprise the step of serializing the plurality of transactions so that the plurality of transactions are processed in the same order in both the backup database and the active database.

According to a further aspect of the present invention, a transaction processing system comprises a database system and a database querying system. The database system comprises a plurality of replicated databases including an active database and at least one backup database. The active database comprises an active database processor and the backup database comprises a backup database processor. The database querying system comprises a database querying system processor configured to access the database system for processing transactions. The database querying system processor is programmed to transmit a first message for one of the transactions to the database system for processing. The active database processor is programmed to process the first message thereby creating a response message and active database transaction state data representative of the transaction. The active database processor is programmed to transmit the response message to the querying system and to forward the first message to the backup database for processing by the backup database processor. The backup database processor is programmed to process the first message thereby creating backup database transaction state data representative of the transaction. The database querying system is further programmed to transmit a second message for the transaction to the database system for processing. The active database processor is further programmed to process the second message using the active database transaction data, and to forward the second message to the backup database. The backup database processor is further programmed to process the second message using the backup database transaction state data.

The backup processor may be programmed to create a suppressed response message in the backup database based on the first transaction message. Alternatively, the backup processor may be programmed not to create a response message in the backup database based on the first transaction message forwarded by the active database. The active database processor may be further programmed to transmit control header data along with the first message to the backup database so that the backup database processor can process the first message consistent with the active database processor. The control header data may comprise unique transaction identification data representative of the transaction or time stamp data. The database querying system processor, the active database processor and the backup database processor may be programmed to process a plurality of transactions. Preferably, the active database processor is programmed to serialize the plurality of transactions so that the plurality of transactions are processed in the same order in the backup database as in the active database.

Preferably, the active database may comprise an active database memory for storing the active database transaction state data. The backup database may comprise a backup database memory for storing the backup database transaction data. The database system may further comprise a plurality of backup databases. The active database processor may be further programmed to access at least one of a plurality of records in the active database to process the first message. Similarly, the backup database processor may be further programmed to access at least one of a plurality of records in the backup database to process the first message.

According to a still further aspect of the present invention, a transaction processing system comprises a database system and a database querying system. The database system comprises a plurality of replicated databases including an active database and at least one backup database. The active database comprises an active database processor and the backup database comprises a backup database processor. The database querying system comprises a database querying system processor configured to access the database system for processing transactions. The database querying system processor is programmed to transmit a first message for one of the transactions to the database system for processing. The active database processor is programmed to process the first message thereby creating a response message and active database transaction state data representative of the one transaction. The active database processor is further programmed to transmit the response message to the querying system for processing, and to forward the first message for the one transaction to the backup database for processing. The backup database processor is programmed to process the first message thereby creating backup database transaction state data representative of the transaction. The database querying system processor is further programmed to transmit a second message for the one transaction to the database system for processing. If the active database is available, then the second message is processed by the active database processor. The active database processor is further programmed to process the second message using the active database transaction data, and to forward the second message to the backup database. The backup database processor is further programmed to process the second message using the backup database transaction state data. Otherwise, the second message for the transaction is processed by the backup database processor. The backup database processor is programmed to process the second message using the backup database transaction state data.

Accordingly, it is an object of the present invention to provide an improved database system and a method of processing a transaction in such a system that allows a transaction to be completed even after an active database fails. It is another object of the present invention to provide such a replicated database system that utilizes non-fault tolerant components but maintains required service reliability. It is yet another object of the present invention to provide such a system that is relatively easy to implement and cost effective. Other features and advantages of the invention will be apparent from the following description, the accompanying drawings and the appended claims.

DETAILED DESCRIPTION OF THE INVENTION

Figure 1:
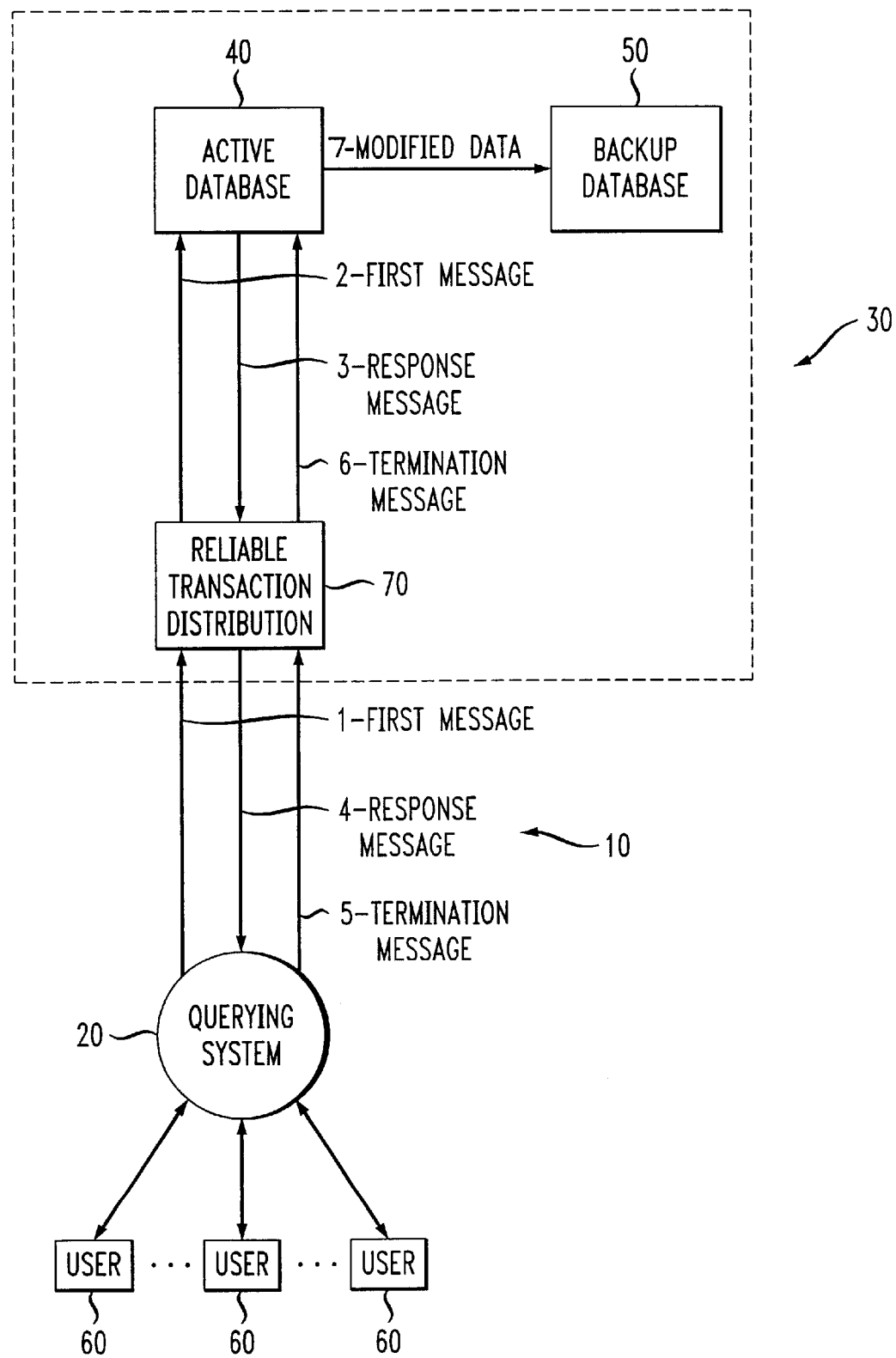
FIG. 1 illustrates a transaction processing system according to the background art.
Figure 2:
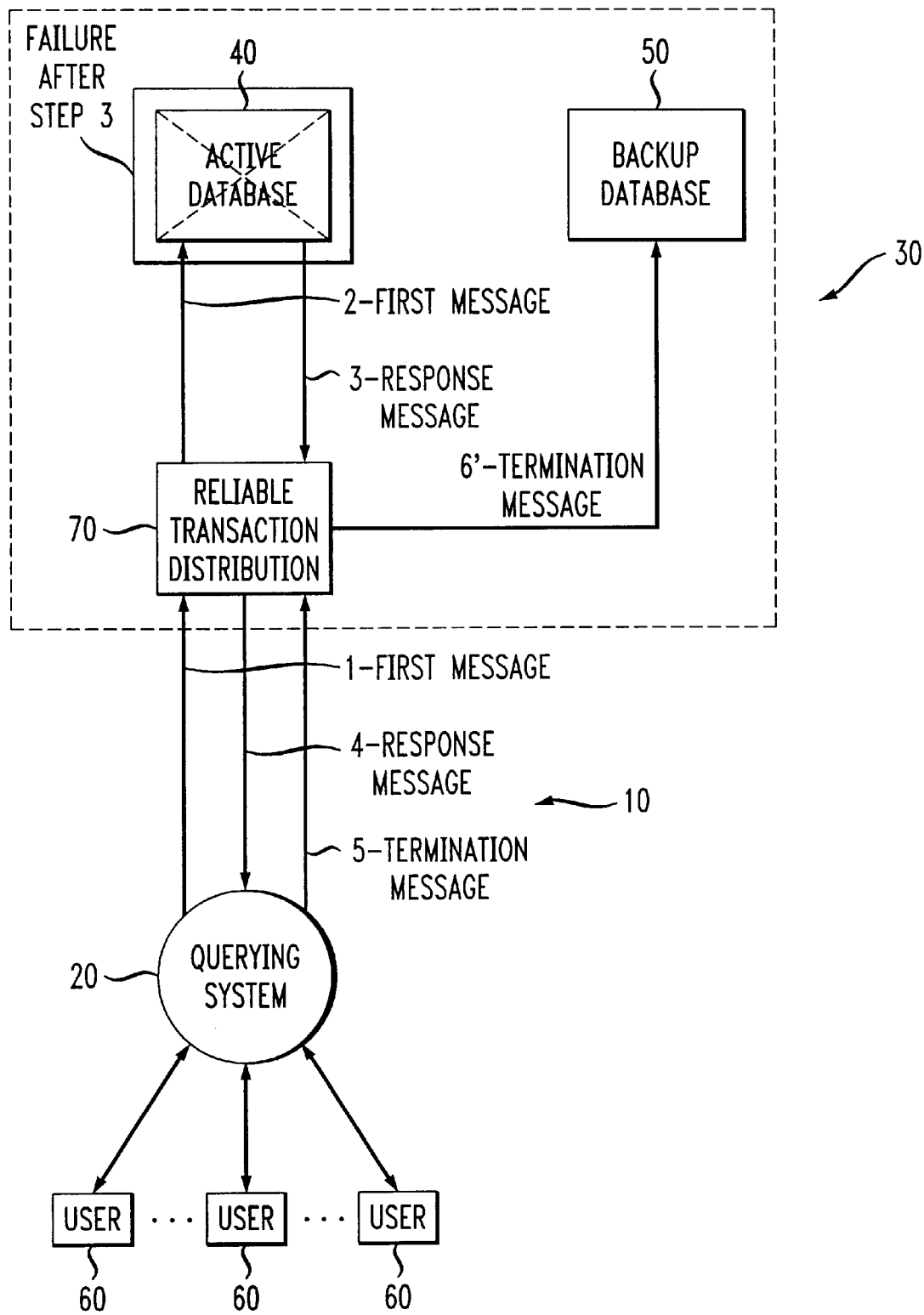
FIG. 2 illustrates the transaction processing system of FIG. 1 in a mid-transaction failure mode.
Figure 3:
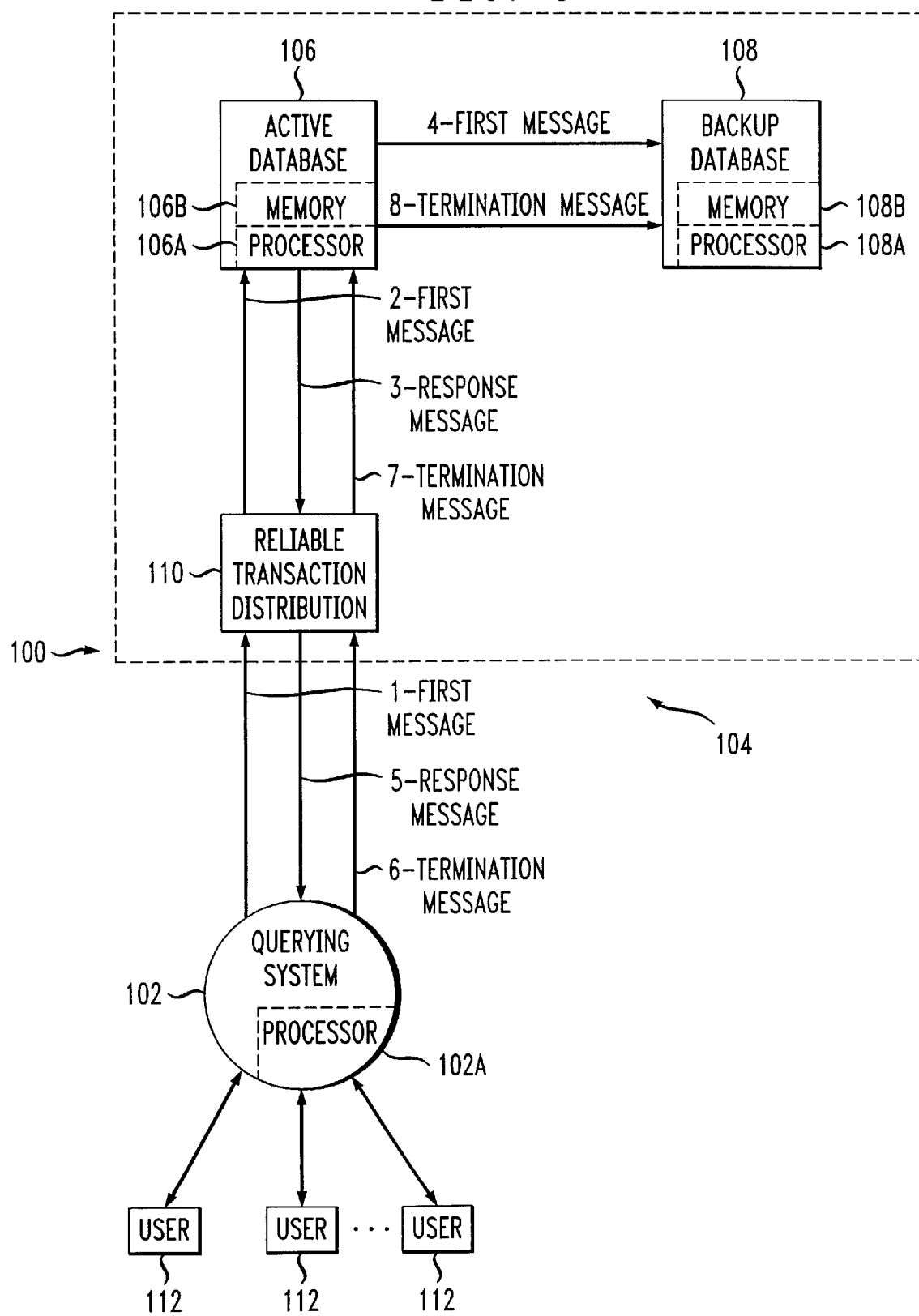
FIG. 3 illustrates a transaction processing system according to the present invention.

Referring now to FIG. 3, a transaction processing system 100 according to the present invention is illustrated. The transaction processing system 100 comprises a database querying system 102 and a logical database 104. The logical database 104 comprises a plurality of replicated databases 106, 108 and a reliable transaction distributor 110. Each of the plurality of replicated databases 106, 108 include a plurality of substantially identical records. It will be appreciated by those skilled in the art that one or more of the replicated databases 106, 108 may include one or more records that the other database does not include. Each of the records in each of the databases 106, 108 include fields of data. For illustrative purposes only, it is presumed for the following discussion that database 106 is the active database while database 108 is the backup database. It will be appreciated by those skilled in the art that the logical database 104 may comprise a plurality of backup databases.

The database querying system 102 is configured to generate transactions accessing specific records in the logical database 104 in response to requests by one of a number of database users 112 accessing the database system 100. The database querying system 102 is the system that requires reliable transaction processing and data storage. A transaction is a sequence of actions or operations that must be performed in its entirety or not at all. A typical transaction includes a number of messages transmitted back and forth between the querying system 102 and the logical database 104. The reliable transaction distributor 110 receives transaction messages from the querying system 102 and transmits them to one of the databases 106, 108 for processing. The reliable transaction distributor 110 also receives response messages from the databases 106, 108 and transmits them to the querying system 102. It will be appreciated by those skilled in the art that the reliable transaction distributor 110 may be located within the querying system 102. It will be further appreciated by those skilled in the art that the querying system 102 and the logical database 104 may each comprise a reliable transaction distributor. The actual database accessed by the reliable transaction distributor 110 is transparent to the querying system 102 and the database user because the reliable transaction distributor 110 determines the replicated database to which it sends the transaction message. It will be appreciated by those skilled in the art that the reliable transaction distributor 110 is viewed logically as one system but could be comprised of a plurality of physical systems.

The database querying system 102 includes a database querying system processor 102A configured to control the databases 106, 108 via the reliable transaction distributor 110. The active database 106 comprises an active database processor 106A configured to process messages for a transaction and active database memory 106B for storing transaction state data. Similarly, the backup database 108 comprises a backup database processor 108A configured to process messages for a transaction and backup database memory 108B.

The querying system 102, the active database 106 and the backup database 108 are configured to process a transaction as follows. A first message of a first transaction is transmitted from the querying system 102 via the querying system processor 102A to the logical database 104 for processing (step 1). The reliable transaction distributor 110 receives the first message and transmits it to the active database 106 for processing (step 2). The active database processor 106A is programmed to process the first message. The active database processor 106A retrieves data from one or more appropriate records in the active database 106 in response to the first message. It should be apparent that data from additional sources may also be retrieved in response to the first message. The active database processor 106A then creates active database transaction state data (TSD) based, in part, from the retrieved data and the first message itself. The active database TSD also includes message correlation data so that the future messages of the transaction may be matched with the appropriate TSD. The active database TSD is stored in the active database memory 106B so as to be available for processing of future messages of the transaction. The active database processor 106A also creates a response message after processing the first message. The response message is transmitted to the reliable transaction distributor 110 for transmission to the querying system 102 (step 3).

The active database processor 106A also forwards the first message to the backup database 108 for processing (step 4). Along with the first message, control header data is transmitted to the backup database 108 so that the first message is processed consistent with the active database 106. The active database 106 and the backup database 108 may not be located in the same room, let alone the same geographic location. Accordingly, the control header data comprises time stamp data, such as date, time of day, day of week or other appropriate time data. The control header also comprises unique transaction identification data so that the backup database 108 and the active database 106 identify each message or transaction consistently. It should be apparent that the control header data may comprise other appropriate data depending on the particular application so that messages are processed consistently by the active database 106 and the backup database 108.

The backup database processor 108A is programmed to process the first message in the same manner as the active database 106 such that the backup database processor 108A retrieves data from one or more appropriate records in the database in response to the first message. It should be apparent that data from additional sources may also be retrieved in response to the first message. The backup database processor 108A also creates backup database transaction state data (TSD) based, in part, on the retrieved data and the first message itself and its associated Control Header data. The backup database TSD also includes message correlation data so that future messages of the transaction may be matched with the appropriate TSD. The backup database TSD is stored in the backup database memory 108B so as to be available for processing future messages of the transaction. The active database TSD and the backup database TSD should be operationally identical so that either database 106, 108 can process future messages for the transaction. While the active database processor 106A is programmed so that it does create a response message, the backup database processor 108A is programmed to not create a response message. If a second response message was created and transmitted to the querying system 102, the querying system 102 would attempt to process both response messages leading to duplicate processing of a single transaction. Alternatively, it should be apparent that the backup database processor 108A may be programmed to create a suppressed response message. That is, the backup database processor 108A performs the steps required to create the response message but then suppresses the response message as long as it is in a backup mode of operation so that multiple response messages are not transmitted in the system.

The TSD in the active database 106 is replicated by the backup database 108 by virtue of the first message being separately processed by the backup database 108. The TSD in the backup database 108 is therefore available in the event that the active database 106 experiences a failure. As the TSD can be many kilobytes in size, it is not practical to simply send the TSD from the active database 106 to the backup database 108 every time that it changes during processing of a transaction. Accordingly, the TSD is replicated by having each message that is processed by the active database 106 also processed by the backup database 108.

The reliable transaction distributor 110 receives the response message from the active database 106 and transmits it to the querying system 102 where it is processed by the querying system processor 102A (step 5). Once the transaction is complete from the perspective of the querying system 102, the querying system processor 102A transmits a second or termination message to the logical database 104 for processing (step 6). Depending on the application, the transaction may require one or more additional messages to be transmitted to the logical database 104 for processing prior to the transmission of the termination message.

The reliable transaction distributor 110 receives the termination message and transmits it to the active database 106 for processing (step 7). The active database processor 106A is programmed to process the termination message using the active database TSD stored in the memory 106B. The active database processor 106A also updates the appropriate records in the database, as necessary, using the active database TSD and the contents of the termination message. The active database processor 106A forwards the termination message along with appropriate control header data to the backup database 108 for processing (step 8). The backup database processor 108A processes the termination message the same as the active database 106 except that the backup database TSD stored in the memory 108B and control header data are used. The backup database processor 108A updates the corresponding appropriate records in the backup database 108, as necessary, using the backup database TSD and the contents of the termination message. The appropriate record in the backup database 108 is modified/updated by virtue of the termination message being processed by the backup database 108. The backup database 108 and the active database 106 therefore remain fully replicated without the active database 106 having to transmit data to the backup database 108 to modify/update records. Once the termination message has been processed, the TSD in the active database memory 106B and the backup database memory 108B are deleted.

Figure 4:
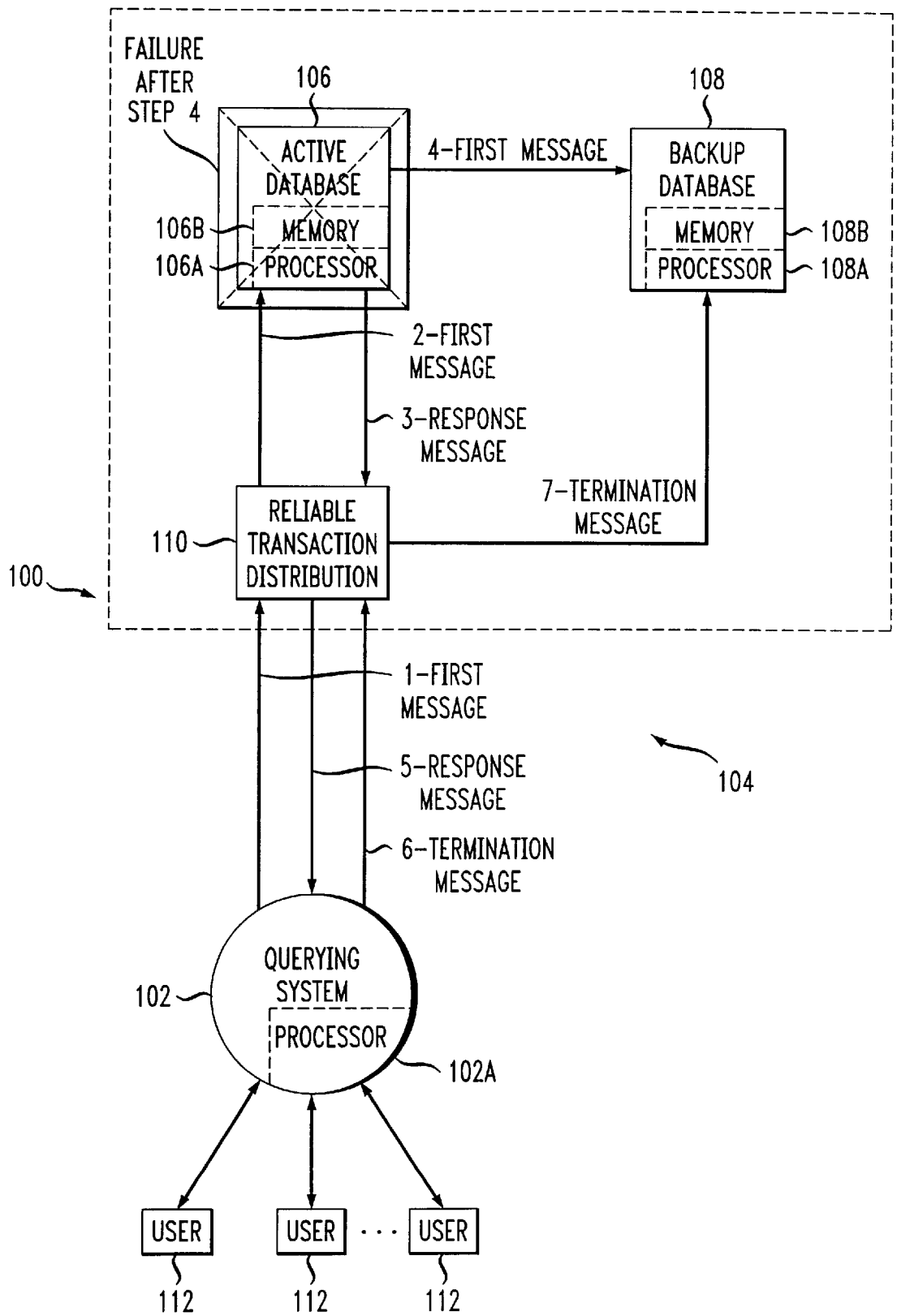
FIG. 4 illustrates the transaction processing system of FIG. 3 in a mid-transaction failure mode.

Referring now to FIG. 4, the above transaction will now be described assuming that the active database 106 fails after the first message is forwarded to the backup database 108 (step 4). The reliable transaction distributor 110 receives the response message from the active database 106 and transmits it to the querying system 102 where it is processed by the querying system processor 102A (step 5). Once the transaction is complete from the perspective of the querying system 102, the querying system processor 102A transmits a termination message to the logical database 104 for processing (step 6).

The reliable transaction distributor 110 receives the termination message and transmits it to the backup database 108 for processing (step 7') since the active database 106 is unavailable. The backup database processor 108A processes the termination message using the backup database TSD. The backup database processor 108A updates the appropriate records in the database as necessary using the backup database TSD and the contents of the termination message. Since the backup database 108 includes its own internal TSD, message correlation succeeds and the message is processed successfully. Further, since every message of the transaction is processed successfully, the transaction is processed successfully. Accordingly, forwarding transactions from the active database 106 to the backup database 108 for separate processing enables non-fault tolerant computing systems to be used to process transactions reliably.

In some applications, the transaction messages processed by the backup database 108 need to be processed in the same order as processed in the active database 106 to maintain consistent TSD. Serialization of the transaction messages is complicated in that there are often multiple transaction processors within a database. One known method of serializing transaction messages is accomplished using a data structure having a double-linked list (DLL) of transaction messages. Messages requiring replication by the active database 106 have a replication indicator data field set "active" upon completion of message processing. These messages "bubble" to the top-of-queue. When such messages reach the top of the queue, the transaction message and corresponding control header data are transmitted to the backup database 108. The message is then cleared from the queue and the replication indicator data field reset.

Transaction messages are thus distributed to the transaction processors in a first-in-first-out (FIFO) manner. For example, assume that the active database 108 includes four transaction processors, TP1, TP2, TP3 and TP4. Message A is sent to TP 1, message B is sent to TP 2, message C is sent to TP 3 and message D is sent to TP 4. Though message D is the last of the messages to be distributed to a TP, it could be the first message completely processed. If the message was simply sent to the backup database 108 upon successful processing by the active database 106, message order would be lost and the potential for TSD inconsistencies would increase. Therefore, a data structure such as the DLL is used to assure proper serialization and sequencing to the backup database 108. Messages that require replication, such as message D in the example, will "bubble" to the top of the queue in the order in which they were received and not in the order in which they were completed. The messages are thus serialized for proper and consistent processing in both the active database 106 and the backup database 108. It will be appreciated by those skilled in the art that some applications will not require exact ordering of messages.

Having described the invention in detail and by reference to preferred embodiments thereof, it will be apparent that modifications and variations are possible without departing from the scope of the invention defined in the appended claims.

What is claimed is:

1. A method for processing a transaction in a replicated database system comprising a plurality of replicated databases, said plurality of replicated databases comprising an active database and at least one backup database, said transaction comprising a plurality of sequential messages that must be performed to complete said transaction, said method comprising the steps of:

receiving at least one message for said transaction from a querying system in said active database;

processing said at least one message for said transaction in said active database, said active database creating corresponding response messages based on said at least one message and creating transaction state data for said active database so that said active database can process subsequently received messages of said transaction;

transmitting said response messages to said querying system;

forwarding said at least one message for said transaction and control header data from said active database to said at least one backup database, said control header data enabling said backup database to process said at least one message consistent with said active database; and processing said at least one message of said transaction in said at least one backup database, said at least one backup database creating transaction state data for said backup database so that said backup database can directly process subsequent messages of said transaction in the event of failure of said active database.

2. The method of claim 1, wherein said step of processing said at least one message for said transaction in said at least one backup database further comprises the step of creating a suppressed response message in said at least one backup database based on said at least one message.

3. The method of claim 1, wherein said step of processing said at least one message for said transaction in said at least one backup database does not comprise the step of creating a response message in said at least one backup database based on said at least one message forwarded by said active database.

4. The method of claim 1, wherein said control header data comprises unique transaction identification data representative of said transaction.

5. The method of claim 1, wherein said control header data comprises time stamp data.

6. The method of claim 1, wherein said steps are repeated for a plurality of transactions.

7. The method of claim 6, further comprising the step of serializing said plurality of transactions so that said plurality of transactions are processed in the same order in said at least one backup database as in said active database.

8. A method for processing a transaction in a replicated database system comprising a plurality of replicated databases, said plurality of replicated databases comprising an active database and at least one backup database, said transaction comprising a plurality of sequential messages that must be performed to complete said transaction, said method comprising the steps of:

transmitting a first message for said transaction from a querying system to said replicated database system;

processing said first message for said transaction in said active database, said active database creating a response message based on said first message and creating transaction state data for said active database so that said active database can process subsequently received messages of said transaction;

transmitting said response message to said querying system;

forwarding said first message for said transaction and control header data from said active database to said at least one backup database, said control header data enabling said backup database to process said first message consistent with said active database;

processing said first message for said transaction in said at least one backup database, said at least one backup database creating transaction state data for said backup database so that said backup database can process subsequent messages of said transaction;

transmitting a second message for said transaction from said querying system to said database system;

processing said second message for said transaction in said active database using said active database transaction state data;

forwarding said second message for said transaction and control header data from said active database to said at least one backup database, said control header data enabling said backup database to process said second message consistent with said active database; and processing said second message for said transaction in said at least one backup database using said backup database transaction state data.

9. The method of claim 8, wherein said step of processing said first transaction message of said transaction in said at least one backup database further comprises the step of creating a suppressed response message in said at least one backup database based on said first transaction message.

10. The method of claim 8, wherein said step of processing said first transaction message of said transaction in said at least one backup database does not comprise the step of creating a response message in said at least one backup database based on said first transaction message forwarded by said active database.

11. The method of claim 8, wherein said control header data comprises unique transaction identification data representative of said transaction.

12. The method of claim 8, wherein said control header data comprises time stamp data.

13. The method of claim 8, wherein said steps are repeated for a plurality of transactions.

14. The method of claim 13, further comprising the step of serializing said plurality of transactions so that said plurality of transactions are processed in the same order in said at least one backup database as in said active database.

15. The method of claim 8, wherein said step of processing said first message for said transaction in said active database comprises the step of storing said active database transaction state data in said active database.

16. The method of claim 8, wherein said step of processing said first message of said transaction in said at least one backup database comprises the step of storing said backup database transaction state data in said at least one backup database.

17. The method of claim 8, wherein said step of processing said first message for said transaction in said active database comprises the step of accessing at least one of a plurality of records in said active database.

18. The method of claim 17, wherein said step of processing said first message of said transaction in said at least one backup database comprises the step of accessing at least one of a plurality of records in said at least one backup database.

19. A method for processing a transaction in a replicated database system Comprising a plurality of replicated databases, said plurality of replicated databases comprising an active database and at least one backup database, said transaction comprising a plurality of sequential messages that must be performed to complete said transaction, said method comprising the steps of:

transmitting a first message for said transaction from a querying system to said database system;

processing said first message for said transaction in said active database, said active database creating a response message based on said first message and creating transaction state data for said active database so that said active database can process subsequently received messages of said transaction;

transmitting said response message to said querying system;

forwarding said first message for said transaction and control header data from said active database to said at least one backup database, said control header data enabling said backup database to process said first message consistent with said active database;

processing said first message of said transaction in said at least one backup database, said at least one backup database creating transaction state data for said backup database so that said backup database can process subsequent messages of said transaction;

transmitting a second message for said transaction from said querying system to said database system;

if said active database is available, then:
  processing said second message for said transaction in said active database using said active database transaction state data;

forwarding said second message for said transaction and control header data from said active database to said at least one backup database, said control header data enabling said backup database to process said second message consistent with said active database; and processing said second message for said transaction in said at least one backup database using said backup database transaction state data; and if said active database is not available:

processing said second message for said transaction in said at least one backup database using said backup database transaction state data.

20. The method of claim 19, wherein said control header data comprises unique transaction identification data representative of said transaction.

21. The method of claim 19, wherein said control header comprises time stamp data.

22. The method of claim 19, wherein said steps are repeated for a plurality of transactions.

23. The method of claim 22, further comprising the step of serializing said plurality of transactions so that said plurality of transactions are processed in the same order in said at least one backup database as in said active database.

24. A system for processing a transaction comprising a sequence of messages that must be performed to complete said transaction, said system comprising:

a database system comprising a plurality of replicated databases, said plurality of replicated databases comprising an active database and at least one backup database, said active database comprising an active database processor and said at least one backup database comprising a backup database processor; and a database querying system comprising a database querying system processor configured to access said database system for processing transactions, said database querying system processor programmed to transmit a first message for one of said transactions to said database system for processing by said active database processor;

wherein said active database processor is programmed to:
  update at least one record in said data storage unit of said active database process in response to said first message and create a response message and transaction state data for said active database so that said active database can process messages subsequent to said first message of said one of said transactions;

transmit said response message to said querying system for processing by said querying system processor; and forward said first message for said one of said transactions and control header data to said at least one backup database for processing by said at least one backup database processor, said control header data enabling said backup database to process said first message consistent with said active database;

and wherein said at least one backup database processor is programmed to process said first message to create transaction state data for completion of said one of said transactions;

and wherein said database querying system is further programmed to transmit a second message for said one transaction to said database system;

and wherein said active database processor is further programmed to:
process said second message using said active database transaction data; and
forward said second message and control header data to said at least one backup database, said control header data enabling said backup database to process said second message consistent with said active database;

and wherein said at least one backup database processor is programmed to process said second message using said backup database transaction state data.

25. The system of claim 24, wherein said at least one backup database processor is programmed to create a suppressed response message in said at least one backup database based on said first transaction message.

26. The system of claim 24, wherein said at least one backup database processor is programmed not to create a response message in said at least one backup database based on said first transaction message forwarded by said active database.

27. The system of claim 24, wherein said control header data comprises unique transaction identification data representative of said transaction.

28. The system of claim 24, wherein said control header data comprises time stamp data.

29. The system of claim 24, wherein said database querying system processor, said active database processor and said at least one backup database processor are programmed to process a plurality of transactions.

30. The system of claim 29, wherein said active database processor is programmed to serialize said plurality of transactions so that said plurality of transactions are processed in the same order in said at least one backup database as in said active database.

31. The system of claim 24, wherein said active database comprises an active database memory for storing said active database transaction state data.

32. The system of claim 24, wherein said at least one backup database comprises a backup database memory for storing said backup database transaction data.

33. The system of claim 24, wherein said database system comprises a plurality of backup databases.

34. The system of claim 24, wherein said active database processor is further programmed to access at least one of a plurality of records in said active database to process said first message.

35. The system of claim 34, wherein said at least one backup database processor is further programmed to access at least one of a plurality of records in said at least one backup database to process said first message.

36. A system for processing a transaction comprising a sequence of operations that must be performed to complete said transaction, said system comprising:
a replicated database system comprising a reliable transaction distributor and a plurality of replicated databases, said reliable transaction distributor distributing messages controlling said operations to said plurality of replicated databases which comprise an active database and at least one backup database, said active database comprising an active database processor and said at lease one backup database comprising a backup database processor; and
a database querying system comprising a database querying system processor configured to access said plurality of replicated databases for processing transactions, said database querying system processor programmed to transmit a first message for one of said transactions to said database system;
wherein said active database processor is programmed to:
process said first message thereby creating a response message and transaction state data for said active database so that said active database can process subsequent messages of said one transaction;
transmit said response message to said querying system for processing by said querying system processor: and
forward said first message for said one transaction and control header data to said at least one backup database for processing by said backup database processor, said control header data enabling said backup database to process said first message consistent with said active database;
and wherein said at least one backup database processor is programmed to process said first message thereby creating transaction state data for said backup database so that said backup database can process subsequent messages of said one transaction;
and wherein said database querying system processor is further programmed to transmit a second message for said one transaction to said database system;
and wherein if said active database is available then said active database processor is further programmed to:
process said second message using said active database transaction data; and
forward said second message and control header data to said at least one backup database, said control header data enabling said backup database to process said second message consistent with said active database;
and wherein said at least one backup database processor is programmed to process said second message using said backup database transaction state data;
and if said active database is not available:
said at least one backup database processor is programmed to process said second message received directly from said reliable transaction distributor using said backup database transaction state data.

* * * * *

UNITED STATES PATENT AND TRADEMARK OFFICE
CERTIFICATE OF CORRECTION

PATENT NO. : 6,347,322 B1
DATED : February 12, 2002
INVENTOR(S) : Robert L. Bogantz, Gary Michael Green and Sidney Dean Hester It is certified that error appears in the above-identified patent and that said Letters Patent is hereby corrected as shown below:

Column 3,
Line 54, "step 6'" should read -- step 6 --.

Column 5,
Line 39, "in the both" should read -- in both --.

Column 4,
Line 15, new paragraph starts here but should not be a separate paragraph --.

Column 8,
Lines 15 and 20, "108 include" should read -- 108 includes --.

Column 11,
Line 1, "step 7' " should read -- step 7 --.

Column 13,
Line 55, "Comprising" should read -- comprising --.

Column 16,
Line 29, "processor:" should read -- processor; --.

Signed and Sealed this

Ninth Day of July, 2002

*Attest:*

JAMES E. ROGAN
*Attesting Officer*  *Director of the United States Patent and Trademark Office*